US005081885A

United States Patent [19]

Shaffer

[11] Patent Number: 5,081,885

[45] Date of Patent: Jan. 21, 1992

[54] DRIVE WITH OSCILLATOR-COUPLED TRANSVERSELY MOVING GEAR ELEMENTS

[75] Inventor: James E. Shaffer, Maitland, Fla.

[73] Assignee: Consulier Industries, Inc., Riviera Beach, Fla.

[21] Appl. No.: 458,149

[22] Filed: Dec. 28, 1989

[51] Int. Cl.$^5$ .................... F16H 37/16; F16H 55/32; F16H 13/08

[52] U.S. Cl. .................................. 74/640; 74/84 R; 74/125; 74/569; 74/465

[58] Field of Search ................. 74/432, 433, 461, 462, 74/463, 464, 465, 425, 458, 110, 640, 84 R, 125, 569; 475/168, 178

[56] References Cited

U.S. PATENT DOCUMENTS

| | | | |
|---|---|---|---|
| 1,847,768 | 3/1932 | Kolbassieff | 74/84 R X |
| 2,928,289 | 3/1960 | Maroth | 74/425 |
| 3,456,529 | 7/1969 | Petroff | 74/84 R |
| 3,468,175 | 9/1969 | Rabek | 74/110 |
| 3,507,159 | 4/1970 | Batty | 74/63 |
| 3,820,413 | 6/1974 | Brackett | 74/465 X |
| 4,535,641 | 8/1985 | Kriz et al. | 74/569 X |
| 4,543,841 | 10/1985 | Ju | 74/461 |
| 4,648,286 | 3/1987 | Nemoto | 74/425 |
| 4,651,586 | 3/1987 | Nemoto | 74/425 |
| 4,713,985 | 12/1987 | Ando | 475/168 |
| 4,798,104 | 1/1989 | Chen et al. | 475/168 X |

FOREIGN PATENT DOCUMENTS

| | | | |
|---|---|---|---|
| 1291590 | 3/1969 | Fed. Rep. of Germany | 74/84 R |
| 59-19769 | 2/1984 | Japan | 74/425 |
| 0165067 | 7/1986 | Japan | 74/462 |
| 1252572 | 8/1986 | U.S.S.R. | 74/462 |
| 48801 | 1/1988 | U.S.S.R. | 74/84 R |
| 867974 | 5/1961 | United Kingdom | 74/640 |

*Primary Examiner*—Allan D. Herrmann
*Assistant Examiner*—Khoi Q. Ta
*Attorney, Agent, or Firm*—Warren L. Franz

[57] ABSTRACT

A worm-like drive mechanism has a plurality of axially-spaced eccentrics rotated by an input shaft located at right angles to an output shaft. A wheel mounted on the output shaft has a circumferential surface with periodic undulations. Oscillators in the form of rollers mounted on pins and captured in respective slots of a fixed carrier are reciprocated through contact with the external surfaces of the eccentrics to cause the undulated surfaces of the wheel to move, thereby driving the output shaft. Contact between the rollers and the eccentrics is achieved through the intermediary of bars which are reciprocated with the rollers.

20 Claims, 2 Drawing Sheets

DRIVE WITH OSCILLATOR-COUPLED TRANSVERSELY MOVING GEAR ELEMENTS

This invention relates generally to power and motion transmission apparatus; and, more particularly, to transmission apparatus applying wave gear technology to a drive of the worm/worm gear type.

BACKGROUND OF THE INVENTION

Numerous types of transmission systems are known for mechanically coupling driving and driven elements whose axes and planes of rotation are transversely positioned relative to one another. One such system is the worm drive transmission wherein a toothed longitudinal driving element, called a "worm," has a rotational shaft oriented at right angles to the shaft of a generally planar circular driven element, called a "worm gear." The worm gear usually has circumferential teeth that mesh with and are mechanically driven by the teeth of the worm.

Worm drives wherein the worm gear teeth are replaced by other elements such as balls or rollers, are illustrated, for example, by the arrangement shown in Nemoto U.S. Pat. No. 4,648,286. In that arrangement, spherical balls occupy recesses spaced circumferentially about a wheel at positions normally assumed by the teeth of the worm gear and are arranged to rotate within the recesses to reduce friction loss during engagement with the worm. Except for rotation about themselves, however, the balls remain fixed relative to the worm wheel, keeping the same positions and performing the same function as the traditional worm gear teeth.

Double-enveloping arrangements for worm drives exist which have the worm element longitudinally curved to assume an hourglass shape that fits the curvature of the worm gear and provides multiple-toothed contact between the elements. This configuration enables the load-carrying and horsepower capacity to be increased but is subject to potential engagement problems should the worm shift the position of its longitudinal axis relative to the worm gear. To alleviate such problems, Nemoto U.S. Pat. No. 4,651,586, for example, proposes the use of rollers mounted on radially movable, outwardly biased assemblies within the confines of radially-directed cylindrical slots located at the usual tooth locations about the worm wheel. The radial movability and rotatability of the rollers facilitates the accommodation of shifts in the worm and changes in lead angle of the worm grooves, but does not otherwise contribute to the driving-driven member drive interaction.

Transmission systems other than worm/worm gear drives are known wherein gears called "wave gears" interact by means of intermediate elements to transfer power and motion between driving and driven members. Such arrangements are disclosed, for example, in Rabek U.S. Pat. No. 3,468,175, Batty U.S. Pat. No. 3,507,159 and Ando U.S. Pat. No. 4,713,985. In a typical such arrangement, first and second wave gears having opposing periodic undulations on facing surfaces are mechanically coupled by means of intermediate carrier-supported oscillators, such as balls or rollers, which are arranged to simultaneously traverse the facing undulated surfaces of both gears. Either one of the wave gears or the oscillator carrier is moved to function as the input driving element, and either one or both of the remaining elements is made movable to serve as the driven element. Traversal of the oscillators along one of the undulated surfaces under action of the driving element drives the oscillators to be reciprocated in a direction generally normal to that surface between points of maximum and minimum amplitude. The other undulated surface is shaped so that the simultaneous contact of the oscillators with the other surface as they are reciprocated causes either the other surface or the oscillator carrier to be driven in a direction at right angles to the reciprocation and locally parallel (i.e. at points of contact with the same oscillator) to the direction in which the driving element is moved. The crests of the undulations are sometimes referred to as the "teeth" or "lobes" of the surfaces, and where the total number of such teeth on a particular surface is small, the element may be referred to as a "cam" or an "eccentric" (viz. a one-toothed or one-lobed member).

Concentric and tangential rotary arrangements, as well as linear arrangements, of wave gear transmissions are known. In each case, the drive and driven elements are locally (viz. tangentially) moved in the same or opposite parallel directions, with the oscillators reciprocating at right angles thereto. The oscillators may be of various known embodiments, including a plurality of roller members respectively riding on different ones of the undulated surfaces and being freewheeling relative to each other.

Gear arrangements in which oscillator-coupled driving and driven gear elements move tangentially in directions transverse to each other as do worm/worm gear drives, are not known to the inventor; nor are wave gear arrangements having input and output shafts transversely disposed as in worm drives. Likewise, oscillator means traversing opposing undulated surfaces, like those employed in wave gear drives, are believed not heretofore known in worm drive arrangements.

SUMMARY OF THE INVENTION

The present invention provides a worm-like drive transmission apparatus having first and second elements movable along directions tangentially transverse to one another, the elements including opposing first and second toothed surfaces mechanically coupled by oscillator means which simultaneously traverse both surfaces to be driven in reciprocation by the one surface in order to impart a driving force through interaction with the other surface.

BRIEF DESCRIPTION OF THE DRAWINGS

Embodiments of the invention have been chosen for purposes of illustration and description, and are shown in the accompanying drawings, wherein.

Throughout the drawings, like elements are referred to by like numerals.

DESCRIPTION OF PREFERRED EMBODIMENTS

Figure 1:
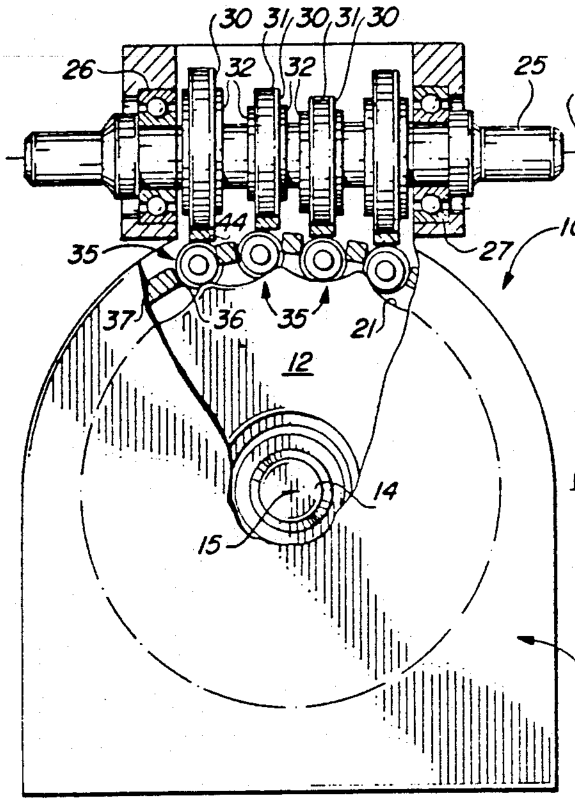
FIG. 1 is a cutaway side view, partially in section, of a worm-like drive in accordance with the invention.
Figure 2:
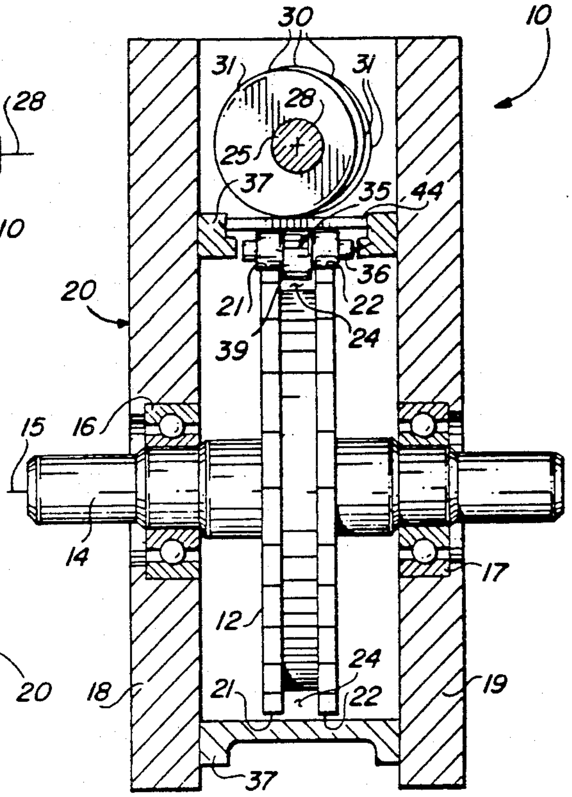
FIG. 2 is an end view in section, with portions removed, of the drive of FIG. 1.
Figure 3:
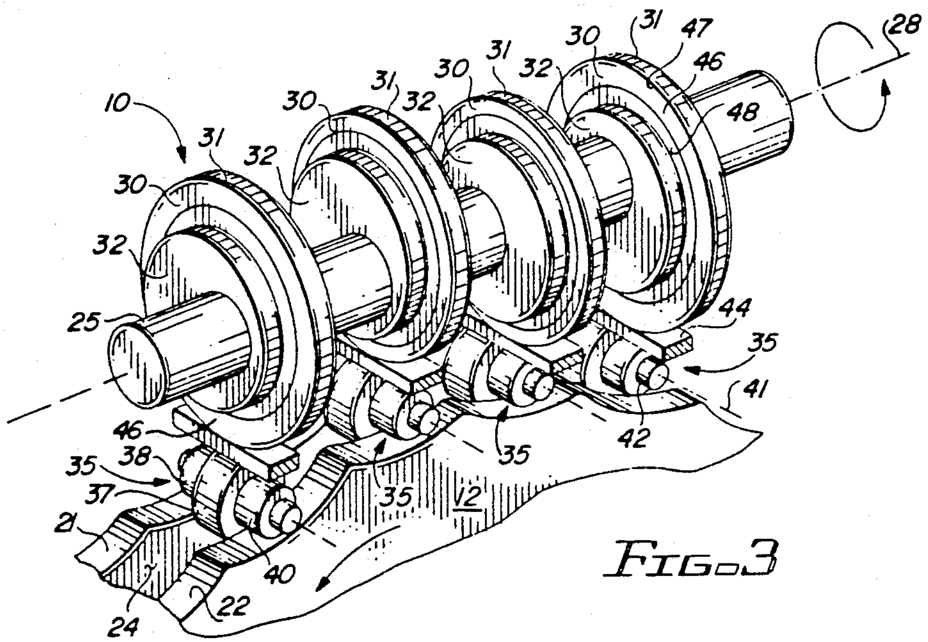
FIG. 3 is a perspective fragmentary view of the active elements of the drive of FIGS. 1 and 2.

The principles of the invention are illustrated, by way of example, embodied in a gear drive assembly 10 shown in FIGS. 1-3. The assembly 10 comprises a wheel element 12 of generally circular shape which is disposed concentrically on an output shaft 14. The shaft 14 is journalled for rotation about a longitudinal axis 15 by means of bearings 16, 17 attached in opposing positions to the spaced walls 18, 19 of a drive housing 20. The element 12 comprises a gear having identical periodically undulated surfaces 21, 22 extending circumferentially thereof at locations axially spaced across a gap 24, as shown. The assembly 10 also includes an input shaft 25 journalled within housing 20 by means of bearings 26, 27 for rotation about a longitudinal axis 28. The axis 28 of the input shaft 25 is disposed transversely at right angles to the axis 15 of the output shaft 14. A plurality of elements 30 having single-toothed or lobed cam surfaces 31 is formed by round bearings disposed on the shaft 25 for rotation therewith and respectively mounted on axially-separated, eccentric shaft segments 32.

Oscillators in the form of roller assemblies 35 are respectively located within matching radially directed slots 36 of a carrier ring 37 (omitted from FIG. 3) located annularly of the wheel 12 to position the oscillators 35 intermediate the surfaces 21, 22 and 31, one oscillator 35 below each eccentric 30. Each roller assembly 35 preferably comprises first, second and third rollers 38, 39, 40 coaxially mounted in axially-adjacent positions for free rotation about a longitudinal axis 41 of a pin 42 (see FIG. 4). The slots 36 and pins 42 are disposed so that the axes 41 are oriented generally parallel to the axis 15 of the output shaft 14 and at right angles to the orientation of axis 28 of the input shaft 25. Each assembly 35 is captured within a corresponding slot 36 located below an eccentric 30.

Figure 4:
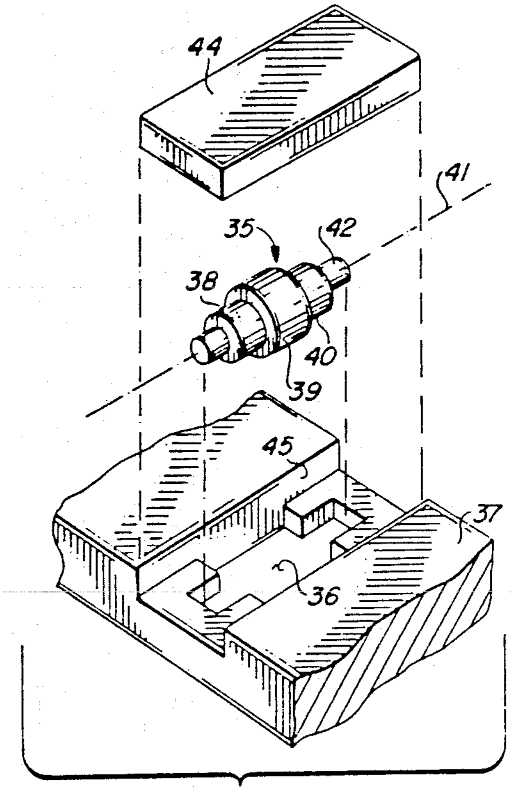
FIG. 4 is an exploded fragmentary view showing the carrier mounting of an oscillator element of FIGS. 1-3.

The end rollers 38, 40 of each assembly 35 are dimensioned, configured and adapted to be in contact with the respective undulated surfaces 21, 22 of the wheel 12. Each assembly 35 also includes a rectangular bar 44 in contact with the central roller 39 and captured for radial movement therewith within the confines of a matching groove 45 (FIG. 4). The bars 44 are in contact with the rollers 39 and the corresponding surfaces 31 when the rollers 38, 40 are in contact with the surfaces 21, 22. As shown, the end rollers 38, 40 are of an identical diameter which is less than the diameter of the central roller 39. The gap 24 separating the surfaces 21, 22 is made wide enough to accommodate the larger roller 39 in the direction of shaft 15 (see FIG. 2). The slots 36 are of rolling pin shape to accommodate the cross-section of the assemblies 35. Clearance is provided between the rollers 38, 39, 40 and the slots 36, so that the rolling motion of the rollers is unfettered. The dimension between the ends of the slots 36 and the pins 42 is such as to restrict non-radial movement of the assemblies 35, with the pins reacting with one side or the other of the slots 36. The independent freewheeling nature of rollers 38, 39, 40 minimizes the relative motion between roller 39 and the bar 44.

The eccentrics 30 may suitably be formed from circular ball, roller or needle bearings 46 (FIG. 3), or the like, whose outer races 47 serve as the surfaces 31 and whose inner races 48 are mounted off-center relative to axis 28 on axially-spaced eccentric segments 32 formed along the input shaft 25. Lock washers or similar locking members (not shown) are used to maintain the bearings 46 in place on the segments 32. The eccentricities of the segments 32 are sequentially angularly offset. For the depicted arrangement of four transverse gear elements 30, the eccentricities of adjacent segments 32 (and, thus, of adjacent elements 30) are shown angularly-shifted by successive 90 degree increments (see FIGS. 3 and 5). The use of eccentric segments 32 on the shaft 14 enables the eccentric elements 30 to be constituted using conventional bearings 46 (FIG. 3) having central bores placed over the shaft 25 at the respective segment 32 positions. It will be appreciated by those skilled in the art to which the invention relates, however, that other ways of providing the same elements 30 exist, such as providing bearings having inner races with off-center bores on a straight shaft. The reason for using bearing elements is to minimize relative motion between the contacting surfaces 31 and 44.

Figure 5:
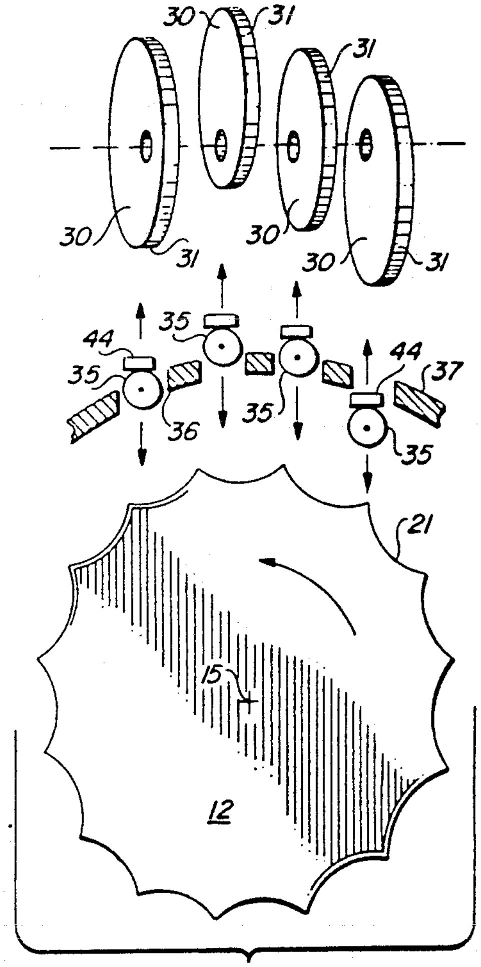
FIG. 5 is a schematic view helpful in understanding the drive of FIGS. 1-4.

In operation, as schematically represented in FIG. 5, rotation of the input shaft 25 in a direction about axis 28 rotates the eccentrics 30 whose outer surfaces 31 are in contact with the bars 44 of the oscillators 35. As the eccentrics rotate, the bars 44 and the central rollers 39 (see FIG. 4) on which the bars 44 rest are reciprocated vertically within the grooves 45 and slots 36 of the carrier 37. This drives the oscillators 35 between maximum and minimum amplitudes in vertical displacements to force the end rollers 38, 40 which share the same pins 42 in reciprocal motion against the surfaces 21, 22 of the wheel 12. This movement of the rollers 38, 40 forces the surfaces 21, 22 and the wheel 12 to be driven in rotation about the axis 15, to thereby turn the output shaft 14 in rotation about the axis 15. The direction of driven rotation of the undulated surfaces 21, 22 and the output shaft 14 is tangentially perpendicular to the direction of driving rotation of the undulated surfaces 31 and the input shaft 25.

The use of independently freewheeling, coaxial rollers 38, 39, 40 and bars 44 for the oscillators 35 greatly alleviates contact stresses in the motion transfer process. The rollers enable the transfer of reciprocal motion to the surfaces 21, 22 using rolling friction. The bars 44 create a line contact transfer of vertical forces from lines in the direction of axis 28 on the surfaces 31 of the driving elements 30 to lines in the direction of axis 15 (i.e. axes 41 of pins 42) on the central rollers 39. In the absence of bars 44, direct transfer of the same forces between the surfaces 31 and the rollers 39 would be by single point contacts.

The relationship between the number of roller assemblies 35 and the number and shape of the teeth of the undulated surfaces 21, 22 may be established in accordance with known wave gear drive techniques. The number of elements 30 will be the same as the number of assemblies 35, and the eccentricities are made to achieve the desired oscillation for driving the selected undulated surfaces 21, 22. To achieve the multiple element coupling between the elements 30 and the wheel 12 using identical oscillators 35, the two end elements 30 of the depicted four input gear element arrangement are chosen of larger dimensions than the two inside elements 30, giving an hourglass contour to the series of elements 30 along the shaft 25, as seen in FIG. 1.

Figure 6:
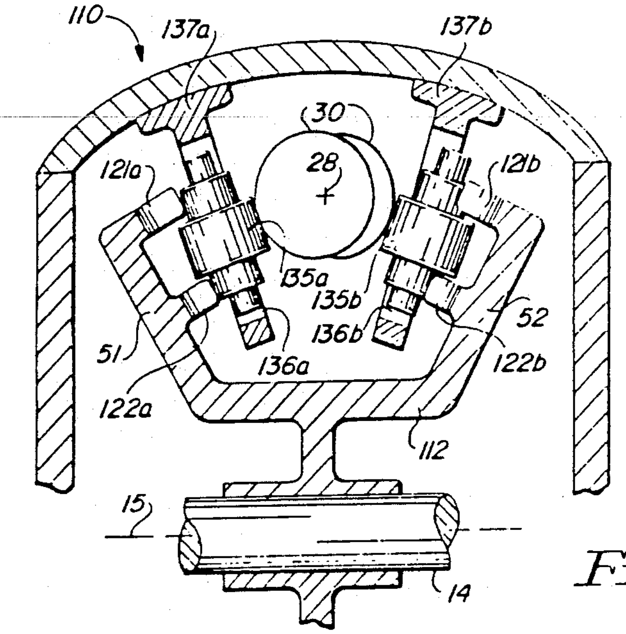
FIG. 6 is a partial end view of a modified form of worm-like drive in accordance with the invention.

A modified high torque embodiment 110 of the drive 10 is shown in FIG. 6. In the drive 110, a wheel 112 has four undulated surfaces **121*a*, 122*a*, 121*b*, 122*b* on each of two circumferential flanges 51, 52 projecting at opposite 45 degree outward directions. The function of carrier ring 37 of drive 10 is served by two rings, one ring 137***a* disposed between the flange 51 and the elements 30 and another ring 137*b* disposed between the flange 52 and the elements 30. The carrier 137*a* has slots 136*a* within which oscillator assemblies 135*a* are captured and the carrier 137*b* has slots 136*b* within which oscillator assemblies 135*b* are captured. As the input shaft 25 is rotated about axis 28, the eccentrics 30 drive the oscillators 135*a* to turn the surfaces 121*a*, 122*a* and simultaneously drive the oscillators 135*b* to turn the surfaces 121*b*, 122*b*, thereby driving the wheel 112 and output shaft 14 about the axis 15.

Those skilled in the art to which the invention relates will appreciate that the preferred embodiments of the invention described in detail above are just examples of how the invention can be implemented and that various substitutions and modifications may be made thereto, without departing from the spirit and scope of the invention as defined by the claims below.

What is claimed is:

1. Apparatus for transmitting motion between an input and an output, comprising:

a first element having a first periodically undulated surface and being adapted to move in a first direction;

a plurality of second elements, each having a cam surface facing said first surface and each being adapted to move in a second direction tangentially transverse to said first direction;

oscillator means mounted to simultaneously traverse said first and second surfaces for mechanically coupling said first and second elements by driving one of said first and second surfaces in response to being driven by the other of said first and second surfaces; said other of said first and second surfaces being shaped to reciprocate said oscillator means between points of maximum and minimum amplitude when moved in its corresponding one of said first and second directions, and said one of said first and second surfaces being shaped to be moved by said oscillator means in its corresponding other of said first and second directions in response to said reciprocation.

2. Apparatus as in claim 1, wherein said apparatus further comprises a rotatable first shaft; and wherein said plurality of second elements comprises a plurality of one-lobed elements mounted in axially-spaced positions along said first shaft.

3. Apparatus as in claim 2, wherein said apparatus further comprises a rotatable second shaft oriented at right angles to said first shaft; and wherein said first element comprises a multi-toothed gear element mounted on said second shaft.

4. Apparatus as in claim 2, wherein said plurality of second elements comprises a plurality of bearing members having inner and outer races, with the inner races eccentrically mounted on to said first shaft; and said second surface comprises an external surface of said outer race of each bearing member.

5. Apparatus as in claim 4, wherein said bearing members are mounted on said first shaft in successively angularly shifted eccentricities relative to said first shaft.

6. Apparatus as in claim ˊ1, wherein said oscillator means comprises a plurality o roller assemblies mounted to simultaneously traverse said first surface and respective different ones of said second surfaces.

7. Apparatus as in claim 6, wherein each said roller assembly comprises a pin, a first roller mounted for free rotation about said pin to traverse said first surface, and a second roller mounted adjacent said first roller for free rotation about said pin to traverse said respective one of said second surfaces.

8. Apparatus as in claim 7, wherein each said roller assembly further comprises a bar, and said second roller is mounted to traverse said second surface through the intermediary of said bar.

9. Apparatus as in claim 8, wherein said one of said first and second surfaces is said first surface.

10. Apparatus as in claim 6, wherein said apparatus further comprises a rotatable first shaft and a rotatable second shaft oriented at right angles to said first shaft; and wherein said first element comprises a multi-toothed gear mounted on said first shaft; said plurality of second elements comprises a plurality of one-lobed elements mounted in axially-spaced positions on said second shaft; and each said roller assembly comprises a third shaft oriented generally parallel to said first shaft and at least one roller mounted for free rotation about said third shaft.

11. Apparatus as in claim 10, wherein assembly further comprises first and second rollers mounted in axially adjacent positions for independent free rotation about said third shaft, with said first roller being mounted to traverse said first surface and said second roller being mounted to traverse a respective one of said second surfaces.

12. Apparatus for transmitting motion between an input and an output, comprising:

a first shaft having a first axis;

a generally circular gear having a first circumferential surface with periodic undulations and being mounted for rotation about said first axis in a first direction on said first shaft;

a second shaft having a second axis and being mounted transversely to said first shaft;

a plurality of eccentrics, each having a second circumferential surface, and said eccentrics being mounted in axially-spaced positions for rotation about said second axis in a second direction tangentially transverse to said first direction on said second shaft;

oscillator means mounted to simultaneously traverse said first and second surfaces for mechanically coupling said first and second shafts by driving one of said gear and eccentrics in response to being driven by the other of said gear and eccentrics; one of said first and second surfaces being shaped to reciprocate said oscillator means between points of maximum and minimum amplitude when moved in its corresponding one of said first and second directions, and the other of said first and second surfaces being shaped to be moved by said oscillator means in its corresponding other of said first and second directions in response to said reciprocation.

13. Apparatus as in claim 12, wherein said oscillator means comprises a plurality of roller assemblies, and each of said roller assemblies comprises a third shaft having a third axis and being oriented transversely to said second shaft and at least one roller mounted for free rotation about said third axis on said third shaft.

14. Apparatus as in claim 13, wherein said third shaft comprises a pin, and each said roller assembly comprises first and second axially-spaced rollers mounted for free rotation on said pin, said first roller being positioned to traverse said first surface; and said second roller being positioned to traverse a respective one of said second surfaces.

15. Apparatus as in claim 14, wherein each said roller assembly further comprises a bar, and said second roller is positioned to traverse said second surface through the intermediary of said bar.

16. Apparatus as in claim 14, wherein said gear further has a third circumferential surface axially-spaced across a gap from said first surface; and each said roller assembly further comprises a third roller axially-spaced from said first and second rollers and mounted for free rotation on said third shaft, said third roller being positioned to traverse said third surface.

17. Apparatus as in claim 16, wherein said first and third rollers are mounted on axially-opposite sides of said second roller, said first and third rollers are of the same diameter, said second roller is of a different larger diameter, and said second roller is disposed in said gap.

18. Apparatus as in claim 17, wherein said plurality of eccentrics comprises a plurality of bearing members eccentrically mounted in successively angularly-shifted eccentricities relative to said second shaft.

19. A gear drive mechanism for transmitting motion between an input shaft and an output shaft, comprising:

an output shaft;

a gear having a first circumferential surface with periodic undulations and being mounted for rotation in a first direction on said output shaft;

an input shaft disposed generally perpendicular to said output shaft;

a plurality of eccentrics, each having a second circumferential surface and said eccentrics being mounted in axially-spaced, different angularly-oriented eccentricities for rotation in a second direction tangentially perpendicular to said first direction on said input shaft;

a plurality of roller assemblies positioned to simultaneously traverse said first surface and respective ones of said second surfaces; said first and second surfaces and said roller assemblies being relatively dimensioned, configured and adapted so that said roller assemblies will be driven in response to rotation of said eccentrics in said second direction by said input shaft to reciprocate between points of maximum and minimum amplitude, and said reciprocation will cause said roller assemblies to drive said gear in said first direction to rotate said output shaft; and carrier means for mounting said roller assemblies and for retaining said roller assemblies against movement other than said reciprocal movement.

20. A drive mechanism as in claim 19, wherein each said roller assembly comprises a pin oriented generally perpendicular to said input shaft; a bar; first and second axially-spaced rollers mounted for independent free rotation about said pin, with said first roller being positioned to traverse said first surface and said bar, and said second roller being positioned to traverse said second surface through the intermediary of said bar.

* * * * *